United States Patent Office 3,442,833
Patented May 6, 1969

3,442,833
STRIPPABLE COATINGS
Gerald Dougherty, Wilmington, and Lewis W. Hall, Jr., Claymont, Del., assignors to Avisun Corporation, Philadelphia, Pa., a corporation of New Jersey
No Drawing. Filed May 17, 1966, Ser. No. 550,650
Int. Cl. C08d 5/20; C08f 29/10; C08b 21/08
U.S. Cl. 260—17
4 Claims

ABSTRACT OF THE DISCLOSURE

A strippable coating composition consisting of from 20 to 80 wt. percent cellulose acetate butyrate and 20 to 80 wt. percent atactic propylene-ethylene block copolymer.

BACKGROUND OF THE INVENTION

Cellulose acetate butyrate is extensively employed as a strippable or peelable plastic coating. Cellulose acetate butyrate is a thermoplastic material which is usually applied as a hot melt, thus avoiding problems with escaping solvents, and provides a tough, water and grease resistant coating. These coatings are used to protect new metal parts and equipment in storage and transit and in various skin and blister packaging applications. Because of the hard smooth surface of cellulose acetate butyrate coatings, these coatings are not suitable for printing or or writing.

DESCRIPTION OF THE INVENTION

It has been found that the addition of atactic propylene-ethylene copolymers to cellulose acetate butyrate produces a clear film which has greater flexibility and resilience than celulose acetate butyrate and provides strippable coatings which are water and grease resistant and retain enough of the mechanical properties of cellulose acetate butyrate to adequately protect items coated therewith.

The compositions of the present invention are thermoplastic and may be applied to the items to be coated as hot melts thus avoiding the use of solvents and the problems inherent therein. In addition the coatings of the invention can be printed or written upon.

The atactic propylene-ethylene copolymer is a by product of the production of crystalline propylene-ethylene sequential block copolymer or propylene-ethylene terminal block copolymer. Such crystalline polymers can be prepared by initially contacting a first feed which can be propylene alone or propylene in admixture with a small quantity of ethylene, in solution in an inert hydrocarbon solvent with a catalyst system consisting of titanium trichloride, a dialkyl aluminum halide, and a glycol ether. After the polymerization has proceeded for a desired length of time, passage of the first feed to the reactor is discontinued, and a second feed, which may be ethylene, or a mixture of ethylene and propylene richer in ethylene than the first feed stream, is passed to the reactor, and polymerization is continued for a second period of time, after which the reaction is stopped by the addition of a polar material, such as an alcohol. Proceeding in this manner, a two-segment block polymer is produced, the first segment of which is polypropylene or a copolymer rich in propylene, and the second segment of which is polyethylene, or a copolymer richer in ethylene than the first segment. Alternatively, the two feeds may be alternated two or more times, yielding a polymer having three or more segments of varying ethylene content. Such a process is described in Belgian Patent 538,-782, and British Patent 994,416.

In carrying out block polymerization, the catalyst components are generally dissolved or suspended in an inert hydrocarbon solvent such as hexane, heptane, or octane, or mixtures thereof, in an appropriate reaction vessel equipped with means to agitate the contents thereof, in the absence of oxygen or moisture. The catalyst containing solvent is then usually brought to a temperature in the range of 25° C. to 150° C., preferably 60° C. to 80° C., and the olefin or mixture of olefins to be polymerized is then pressured into the reactor. Moderately elevated pressures, as from 20 p.s.i.g., to 500 p.s.i.g. are used in order to increase the amount of olefin dissolved in the solvent, and thus speed the reaction.

The aluminum component of the catalyst system may be any dialkyl aluminum halide, such as diethyl aluminum chloride, dipropyl aluminum chloride, dibutyl aluminum chloride or the corresponding bromine or iodine analogues, as well as dialkyl aluminum halides the ethyl radicals of which contain greater numbers of carbon atoms than those illustrated above. The glycol ether component of the catalyst may be any glycol ether, such as ethylene glycol dimethyl or diethyl ether, and corresponding diethers of diethylene glycol, triethylene glycol, or higher glycols.

In one known process for producing crystalline propylene-ethylene copolymers, the atactic (essentially non-crystalline) propylene-ethylene copolymer is formed during the stereo specific polymerization of propylene and ethylene. The atactic propylene-ethylene copolymer usually represents from about 5–15 wt. percent of the polymerization product, the remainder by an essentially propylene-ethylene copolymer.

One method of producing the atactic propylene-ethylene block copolymers of the present invention comprises charging to a 50-gallon autoclave having an agitator for mixing disposed therein and a means for controlling heat transfer such as a steam jacket, 25 gallons of an inert liquid hydrocarbon containing 10 to 100 p.p.m. hydrogen and having dispersed therein a coordinate complex catalyst mixture. The copolymer is made in two stages during the first of which the autoclave is maintained at a temperature in the range of 100°–170° F. Pressure is maintained in the autoclave in the range of 80–120 p.s.i.g. by feeding propylene monomer the introduction of which initiates polymerization of the first segment of the copolymer molecule. When the desired amount of propylene monomer is polymerized the propylene feed is discontinued and the pressure is then maintained by introduction of ethylene or a mixture of propylene and ethylene monomer in a predetermined molar ratio according to the type of copolymer desired. The introduction of the monomer mix initiates the second phase of the copolymer polymerization. The second or final phase of the copolymer polymerization is terminated when the desired amount of monomer mix has been fed to the autoclave to obtain terminal block copolymer or the steps repeated to produce a sequential block copolymer. The reaction is thereafter killed by introducing methanol into the hot reaction mixture in sufficient quantities to deactivate the catalyst therein. The deactivated mixture is subsequently withdrawn from the autoclave and the solid or isotactic copolymer (essentially crystalline) product is separated from the polymerization slurry by filtering. The filtrate from this separation containing the atactic propylene-ethylene copolymer (essentially non crystalline) in solution is then subject to flash evaporation or steam stripping whereby a solid atactic propylene-ethylene block copolymer is recovered from the polymerization solvent.

As previously stated the copolymer product which forms a part of the present invention is the solid predominantly amorphous heptane soluble fraction recovered from a multi-stage polymerization of propylene and ethylene using a stereospecific catalyst system as hereinabove described. The copolymer product is normally referred to as atactic propylene-ethylene block copolymer.

The solid atactic propylene-ethylene copolymers suitable for the compositions of the invention have a molecular weight in the range of 15,000–225,000 (viscosity average). The atactic propylene-ethylene copolymer is soluble in boiling pentane, hexane, heptane, and other hydrocarbons. The atactic propylene-ethylene copolymers employed in the present invention are predominantly polypropylene with small amounts of ethylene 0.5 to 49 wt. percent in the propylene polymer chain. The present copolymers are readily distinguished from amorphous ethylene-propylene copolymers which usually have high polyethylene content. The atactic propylene-ethylene copolymer is essentially amorphous copolymer with minor amounts of stereoblock copolymer and isotactic copolymer.

The atactic propylene-ethylene block copolymers employed in the examples is terminal block and has an average molecular weight of about 110,000, a capillary viscosity at 230° C. of about 75,000 centipoise, about 25% crystallinity and a ring and ball softening point of 157° C.

Atactic polymers of the type employed herein are further characterized in La Chemica e F'Industria 39, No. 4, pp. 275–283 (1957) and Journal of Applied Polymer Science, vol. IV, No. 11, pages 219–224 (1960).

As reported in La Chemica e F'Industria 39, No. 4, 275–283 (1957) the insoluble polymer product of the above processes are of a high molecular weight and of high crystallinity. The crystallinity of such polymers is due to their exceptionally regular structure, characterized by the fact that their linear chains, at least over long segments, are composed of regular sequences of monomer units having tertiary carbon atoms with the same steric configuration. The chains having such steric structure were given the name "isotactic" and the polymers containing them were called isotactic. Alternately the soluble fraction of the polymer product produced is found to contain only a small fraction of stereo-regular polymers and is generally referred to as the atactic fraction.

It has further been reported in the Journal of Applied Polymer Science, vol. IV, No. 11, pp. 219–224 (1960) that the heptane soluble polymer fractions of the propylene polymerization which has previously been referred to as the "atactic" fraction contained 17–49% isotactic polymer as measured by solubility tests.

In general it has been reported that the heptane soluble propylene polymer fraction often referred to as the atactic fraction is composed of three polymer types according to molecular structure, namely isotactic which is defined above; amorphous polypropylene which is defined as a polymer of a non-stereoregular structure, which polymer is not crystallizable and stereoblock polymer which has been described as a generally linear alphaolefin polymer having crystallizable segments of stereoregular structure and non-crystallizable segments of irregular structure in the same molecule. It is this atactic fraction which is usable in the compositions of the present invention.

For the purposes of the present invention the above definition of atactic polypropylene as being synonomous with the heptane soluble fraction of propylene polymer will be adhered to, and the copolymer of the present invention is termed atactic propylene-ethylene block copolymer.

Cellulose acetate butyrate is the mixed ester of cellulose and acetic and butyric acids. Generally the mixed esters are produced by the reaction of cellulose with a mixture of the acetic anhydride and the acetic acid and butyric anhydride and butyric acid in the presence of a sulfuric acid catalyst. Such preparations are well known and are fully disclosed in Alexander "Colloid Chemistry" Rheinhold, New York, 1946, volume VI, pp. 917–925 (Malm, C. J., Fordyce, C. R.).

Cellulose acetate butyrate employed in the present invention contains 5–30 weight percent acetate groups and 16–50 weight percent butyrate groups and has a melting point in the range of 165–240° C. and viscosity in the range of 0.8–50 seconds (ASTM–1343–54T). The particular cellulose acetate butyrate employed in the examples of the present invention contain about 6 weight percent acetate groups and about 48 weight percent butyrate groups and has a melting point of about 170° C. and viscosity of about 5 seconds.

The admixture is made by thoroughly mixing the ingredients at a temperature in the range of 200° F. to 400° F. and preferably 300° F. to 350° F. One convenient method is by use of a heated Sigma blade mixer.

For application to a surface, the adhesive is heated to a temperature in the range of 250° F. to 400° F., then applied to the surfaces which are to be coated in any suitable manner.

Suitable relative amounts of ingredients are 20–80 weight percent of the cellulose acetate butyrate and 20–80 weight percent of the atactic propylene-ethylene copolymer.

In addition to the atactic propylene-ethylene copolymers and the cellulose acetate butyrate the compositions may contain such functional ingredients as fillers, plasticizers, antioxidants, solvents, thinners, coloring agents and the like.

The examples presented herein are intended to be merely illustrative and are not intended to limit the scope of the claims. Certain ranges of components have been specified and it is to be understood that those of skill in the art will be able to select the respective proportion from each range so as to produce compositions within the spirit and scope of the invention. The examples provide the guidelines to indicate to those of skill in the art the means and manner of component selection and compounding.

Examples 1–5

The compositions were prepared as indicated above. Examples 4 and 5 are controls. After the compositions were prepared, a coating of each was applied to paper cards by heating the compositions to about 350° F. and calendering them over one side of the paper cards. The coatings were allowed to cool to ambient temperature. The coatings were tested by printing on the surface, flexing and creasing the cards and coatings, and peeling the coatings from the cards. The results are set out in the table below. Observations were made on the clarity of the coatings and the tendency of the stripped coatings to elongate. The coatings employed in the examples were about 2–20 mils in thickness.

| Example | 1 | 2 | 3 | 4 | 5 |
|---|---|---|---|---|---|
| Compositions: | | | | | |
| (I) Cellulose acetate butyrate, wt. percent | 25 | 50 | 75 | 100 | |
| (II) Atactic propylene-ethylene copolymer, wt. percent | 75 | 50 | 25 | | 100 |
| Test: | | | | | |
| (III) Clarity | Good | Good | Good | Good | Good |
| (IV) Printability | Yes | Yes | Yes | No | No |
| (V) Flexibility | Good | Good | Good | Poor | Good |
| (VI) Peelable | Yes | Yes | Yes | Yes | Questionable |
| (VII) Elongation | Fair | Little | Little | None | Considerable |

The coatings according to the invention are clear up to about 15/1000 (15 mils) of an inch thickness where slight clouding begins to be noticeable. All of the coatings adhered well to the substrate. The coating of Example 4 cracked on being creased whereas the coatings on the other examples could be creased several times before cracking. All of the coatings except Example 5 possessed no tack at ambient temperatures. All of the coatings except Example 5 were readily removed without causing any tearing of the substrate. On attempting to peel the composition in Example 5, there is no failure in the substrate; however, there is considerable "stringing" from the coating to the substrate and the coating tends to break apart and not peel off as a single piece. The coatings were tested for printability by writing on them with a ball point pen. Examples 1–3 were easily written on and once the solvent had evaporated from the ink the markings were permanent. Example 4 could not be written on satisfactorily. Example 5 tears when sufficient pressure to write is applied. Examples 1–3 appear to have essentially the same tensile strength as Example 4 but exhibit slight elongation when pulled. Example 5 exhibits considerable elongation and is easily pulled apart by hand.

The cellulose acetate butyrate and atactic propylene-ethylene copolymer are compatible within the ranges shown and produce homogeneous mixtures that do not separate on standing hot.

In addition to the packaging, the compositions of the present invention are also useful for coating wire, metal, cable, fabric, leather and plastic.

The invention claimed is:

1. A strippable coating composition consisting essentially of 20 to 80 wt. percent cellulose acetate butyrate and 20 to 80 wt. percent atactic propylene-ethylene block copolymer.

2. A strippable coating composition according to claim 1 wherein the atactic propylene-ethylene block copolymer has a molecular weight in the range of 15,000 to 225,000.

3. A strippable coating composition according to claim 2 wherein the cellulose acetate butyrate contains 5 to 30 wt. percent acetate groups, 16 to 50 wt. percent butyrate groups and has a melting point in the range of 165 to 240° C.

4. A strippable coating composition according to claim 3 wherein the atactic propylene-ethylene block copolymer is a terminal block copolymer.

References Cited

UNITED STATES PATENTS

| | | | |
|---|---|---|---|
| 2,486,012 | 10/1949 | Ernst | 106—190 |
| 3,066,033 | 11/1962 | Clark | 106—169 |
| 3,329,741 | 7/1967 | Shrage et al. | 360—878 |

WILLIAM H. SHORT, *Primary Examiner.*

E. NIELSEN, *Assistant Examiner.*

U.S. Cl. X.R.

260—878; 117—6, 166

FO-1050
(5/69)

UNITED STATES PATENT OFFICE
CERTIFICATE OF CORRECTION

Patent No. 3,442,833     Dated 5/6/69

Inventor(s) Gerald Dougherty and Lewis W. Hall, Jr.

It is certified that error appears in the above-identified patent and that said Letters Patent are hereby corrected as shown below:

Column 1, line 28, delete "or".

Column 2, line 30, before "propylene" insert -- crystalline --.

Column 5, line 2, "(15 mils)" should be -- ($\underline{15}$ mils) --; line 28, delete "the" in its first occurrence in that line.

SIGNED AND
SEALED

OCT 21 1969

(SEAL)
Attest:

Edward M. Fletcher, Jr.

Attesting Officer

WILLIAM E. SCHUYLER, JR.
Commissioner of Patents